United States Patent
Wu et al.

(10) Patent No.: US 6,906,501 B2
(45) Date of Patent: Jun. 14, 2005

(54) CONTROL METHOD FOR PARALLEL-CONNECTED POWER CONVERTERS

(75) Inventors: Chin-Chang Wu, Kaohsiung (TW); Hurng-Liang Chou, Kaohsiung (TW); Nan-Ying Shen, Kaohsiung (TW); Yao-Jen Chang, Kaohsiung (TW)

(73) Assignee: UIS Abler Electronics Co., Ltd., Hsintien (TW)

( * ) Notice: Subject to any disclaimer, the term of this patent is extended or adjusted under 35 U.S.C. 154(b) by 74 days.

(21) Appl. No.: 10/434,207

(22) Filed: May 9, 2003

(65) Prior Publication Data

US 2004/0076027 A1 Apr. 22, 2004

(30) Foreign Application Priority Data

Oct. 22, 2002 (TW) ........................................ 91124874 A

(51) Int. Cl.⁷ ................................................ G05F 1/40
(52) U.S. Cl. ...................................................... 323/269
(58) Field of Search ................................. 323/207, 208, 323/222, 224, 282, 285, 269, 274; 363/65, 71, 80, 81, 89, 97, 39, 40, 37

(56) References Cited

U.S. PATENT DOCUMENTS 6,693,409 B2 * 2/2004 Lynch et al. ................ 323/208

* cited by examiner

Primary Examiner—Rajnikant B. Patel
(74) Attorney, Agent, or Firm—Bacon & Thomas, PLLC

(57) ABSTRACT

A control method for the parallel-connected power converters includes a control circuit comprising a voltage feedback circuit and a current feed-forward circuit. The voltage feedback circuit, consisting of a voltage regulated control circuit and a waveform control circuit, is used to control the power converter's output voltage with constant amplitude and low total harmonic distortion. By adjusting the gain of waveform control circuit, it can regulate the current distribution among the parallel-connected power converters. The current feed-forward circuit separates the power converter's output current into the fundamental component and the harmonic component, and amplifies them by different gain. The amplified fundamental component acts as a fundamental resistor to suppress the circulating current among the parallel-connected power converters, and the amplified harmonic component acts as a harmonic damper for preventing from high frequency oscillation generated by the L-C filter.

13 Claims, 2 Drawing Sheets

CONTROL METHOD FOR PARALLEL-CONNECTED POWER CONVERTERS

BACKGROUND OF THE INVENTION

1. Field of the Invention

The present invention is related to a power converter control method and more particularly applied in a parallel-connected operation, thereby automatically balancing the load current distribution among power converters and reducing the total harmonic distortion of output voltage under the nonlinear load.

2. Description of the Related Art

In order to provide high capacity and high quality of an AC electric power, it can be implemented by using a high-capacity power converter or several low-capacity power converters. In the views of the extensible ability and the reliability of a power system, the parallel-connected operation of several low-capacity power converters is better than the singular operation of one high-capacity power converter.

The major problem for parallel-connected operation of several low-capacity power converters is the unbalanced current distribution among power converters. The unbalanced current distribution of power converter may result in over-current of the individual power converter. Besides, the parallel-connected power converters may result in the circulating current among them. It may result in increasing the power loss in the power converters, reduction of the power efficiency of the entire parallel-connected system, and over-current of the individual power converter.

The conventional control methods for the operation of parallel-connected power converters include the master-slave control method, the concentrated distribution control method, the logical distribution control method, a ring control method and a drooping control method.

In the master-slave control method, one of the parallel-connected power converters is regarded as a master power converter and it is controlled by the voltage mode control, thereby supplying a regulated output voltage with low total harmonic distortion. Meanwhile, the other power converters are operated as slave power converters controlled by the current mode control to share the equalized distribution current. A load current distribution circuit is used to decide the output current of each power converter. Thus, it requires the communication signals of current distribution information among the power converters.

The concentrated distribution control method is similar to the master-slave control method. The difference between the concentrated distribution control method and the master-slave control method is that all of the parallel-connected power converters of concentrated distribution control method are operated in the current mode control. A current distribution circuit is used to decide the output current of every power converters. Each of the parallel-connected power converters is controlled by an outer voltage control loop and an inner current control loop, thereby supplying a regulated output voltage with low total harmonic distortion. In this method, the parallel-connected power converters system will be failed if the current distribution circuit is failed.

The logical distribution control method uses a control circuit to detect the output current of each power converter. This control circuit collects the output currents of all power converters and averages them to determine the reference output current of each power converter. Then the control circuit, using the current control mode, controls the output current of each power converter to be identical to the reference output current. Hence, the output current of each power converter is regulated to be equal. In this method, the output currents of all parallel-connected power converters must be collected and the numbers of power converter to be paralleled must be pre-known. If any of the parallel-connected power converters is failed, the parallel-connected system will be failed.

The ring control method is similar to the logical distribution control method. However, a control circuit merely retrieves the output of one preceding member of power converter other than all of them and regards it as a reference signal in the ring control method. As the first member of the power converter, it retrieves the output of the last member and regards it as a reference signal. All of the power converters constitute a ring structure. The power converters are controlled by the current mode control to guarantee its output current is identical to the reference signal and supplied a regulated output voltage with low total harmonic distortion. Thus, it requires to get the output current signal of the preceding power converter and to supply the output current signal to the next power converter.

In the above control methods, the current distribution information must be communicated among the power converters. The communication information is easy to be interfered. Therefore, the reliability of parallel-connected power converters will be degraded.

Another control method for parallel-connected power converters is the drooping control method. The conventional P-Q control method is used in this method. The P-Q control method controls the real power supplied from a power converter by means of controlling its voltage phase and reactive power supplied by means of controlling its voltage amplitude. To obtain a stable parallel-connected power converter system, the drooping control method controls the phase (frequency) and the amplitude of the power converter in a negative-slope relationship. In the drooping control method, the output voltage of power converter may be decreased while the output current is increased, and thus the current supplied from each power converter is varied. Equal current distribution supplied from each power converter becomes well if the drooping slope is increased and thus its voltage regulation is degraded. On the contrary, the voltage regulation is improved if the drooping slope is decreased and thus the equal current distribution becomes poor. Although the drooping control method does not use communication signals of distribution current information among the power converters, it has drawbacks that the output current of each power converter is not the same and the voltage regulation is degraded.

The present invention intends to provide a control method for parallel-connected power converters. This method does not use the communication of distribution current signals among the parallel-connected power converters to increase the reliability. Moreover, it can effectively improve the voltage regulation at load terminal, unify the equal current distribution of the output current among power converters and reduce the total harmonic distortion of output voltage under a nonlinear load.

SUMMARY OF THE INVENTION

The primary objective of this invention is to provide a control method for parallel-connected power converters. In this method, it does not use the communication signal for current distribution among the parallel-connected power converters. This control method can increase the reliability, improve voltage regulation at load terminal, suppress the circulating current among power converters and reduce the total harmonic distortion of output voltage under a nonlinear load.

The control method in accordance with the present invention mainly includes a control circuit consisting of a voltage feedback circuit and a current feed-forward circuit. The voltage feedback circuit further includes a voltage regulated control circuit and a waveform control circuit. The voltage regulated control circuit is used to control the output voltage of power converter with constant amplitude no matter what the variation of load. The waveform control circuit is used to control the waveform of the power converter's output voltage. Hence, the power converter can reduce the total harmonic distortion of output voltage so as to supply a high quality AC power to loads. In addition, the gain of the waveform control circuit is changed within a range and inversely proportional to the amplitude of power converter's output current, thereby regulating, as far as possible, each output current thereof. The current feed-forward circuit separates the power converter's output current into the fundamental component and the harmonic component, and amplifies them by different gain respectively. Because the variation of phase/amplitude exists between the output fundamental voltages of power converters, it generates a significant fundamental component of circulating current among the parallel-connected power converters. The amplified fundamental component of feed-forward power converter's output current can be regarded as a fundamental resistor serially connected to the output terminal of the power converter, thereby suppressing the fundamental circulating current among the power converters. The suppression effect is proportional to the gain of the amplified fundamental component of feed-forward power converter's output current. The amplified harmonic component of feed-forward power converter's output current can be regarded as to a harmonic resistor serially connected with the output filter of the power converter and act as a damper, thereby preventing from high frequency oscillation generated by the filter. In designing the waveform control circuit, it is simplified by adding the equivalent harmonic resistor and designing the waveform control circuit with a higher gain, thereby the total harmonic distortion of output voltage under a nonlinear load can be reduced. The outputs of the voltage feedback circuit and the current feed-forward circuit are added to form a modulation signal, which is injected into a pulse-width modulation circuit to obtain the driver signals for the power converter.

The amplified gain in the waveform control circuit of the voltage feedback circuit is inversely proportional to the amplitude of power converter's output current. Meanwhile, the current feed-forward circuit can control the power converter to act as an equivalent fundamental resistor serially connected thereto, thereby the output currents of parallel-connected power converters can be distributed equally.

Other objectives, advantages and novel features of the invention will become more apparent from the following detailed description and the accompanying drawings.

BRIEF DESCRIPTION OF THE DRAWINGS

The present invention will now be described in detail with reference to the accompanying drawings herein.

DETAILED DESCRIPTION OF THE INVENTION

Figure 1:
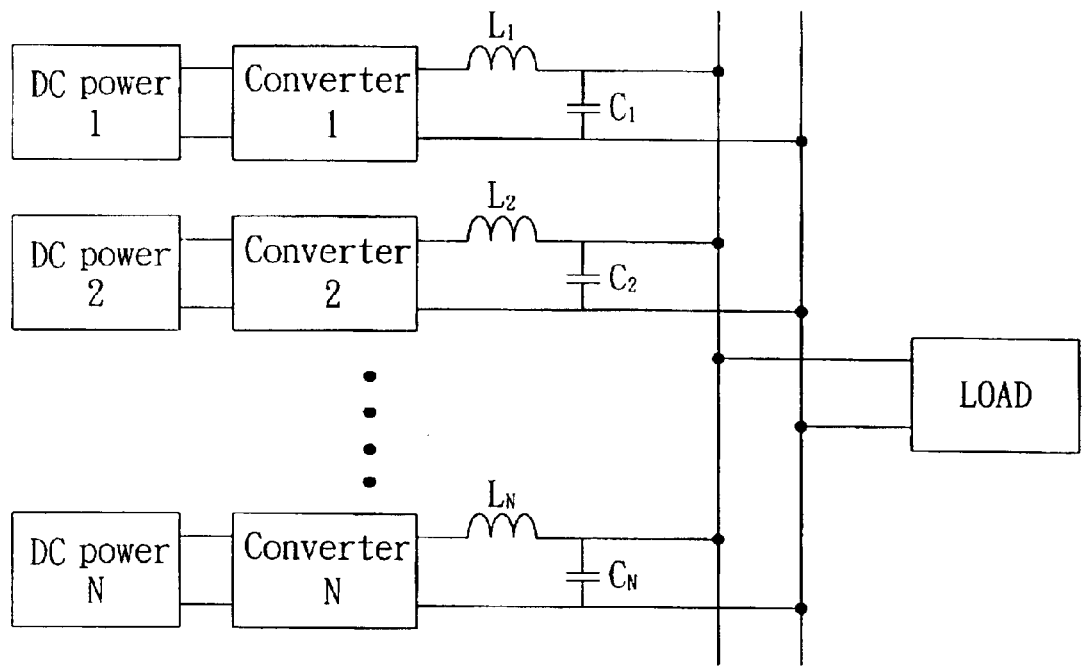
FIG. 1 is a schematic view of parallel-connected power converters in accordance with an embodiment of the present invention.

FIG. 1 illustrates the operation of parallel-connected power converters. Referring to FIG. 1, each parallel-connected power converter has an input terminal connected to a DC power source, and an output terminal connected to a low pass filter consisted of an inductor and a capacitor, which is adapted to filter the high-frequency voltage generated by the power electronic switch elements of power converter. The output voltage of each parallel-connected power converter passes through the L-C low pass filter, and then connects the outputs of all parallel-connected power converters to loads.

Figure 2:
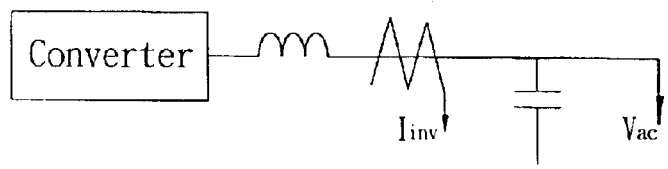
FIG. 2 is a single-line diagram of each of parallel-connected power converters in accordance with the embodiment of the present invention.

FIG. 2 illustrates the output current $I_{inv}$ and the output voltage $V_{ac}$ of power converter, which are applied to the control method of each parallel-connected power converter in the present invention.

Figure 3:
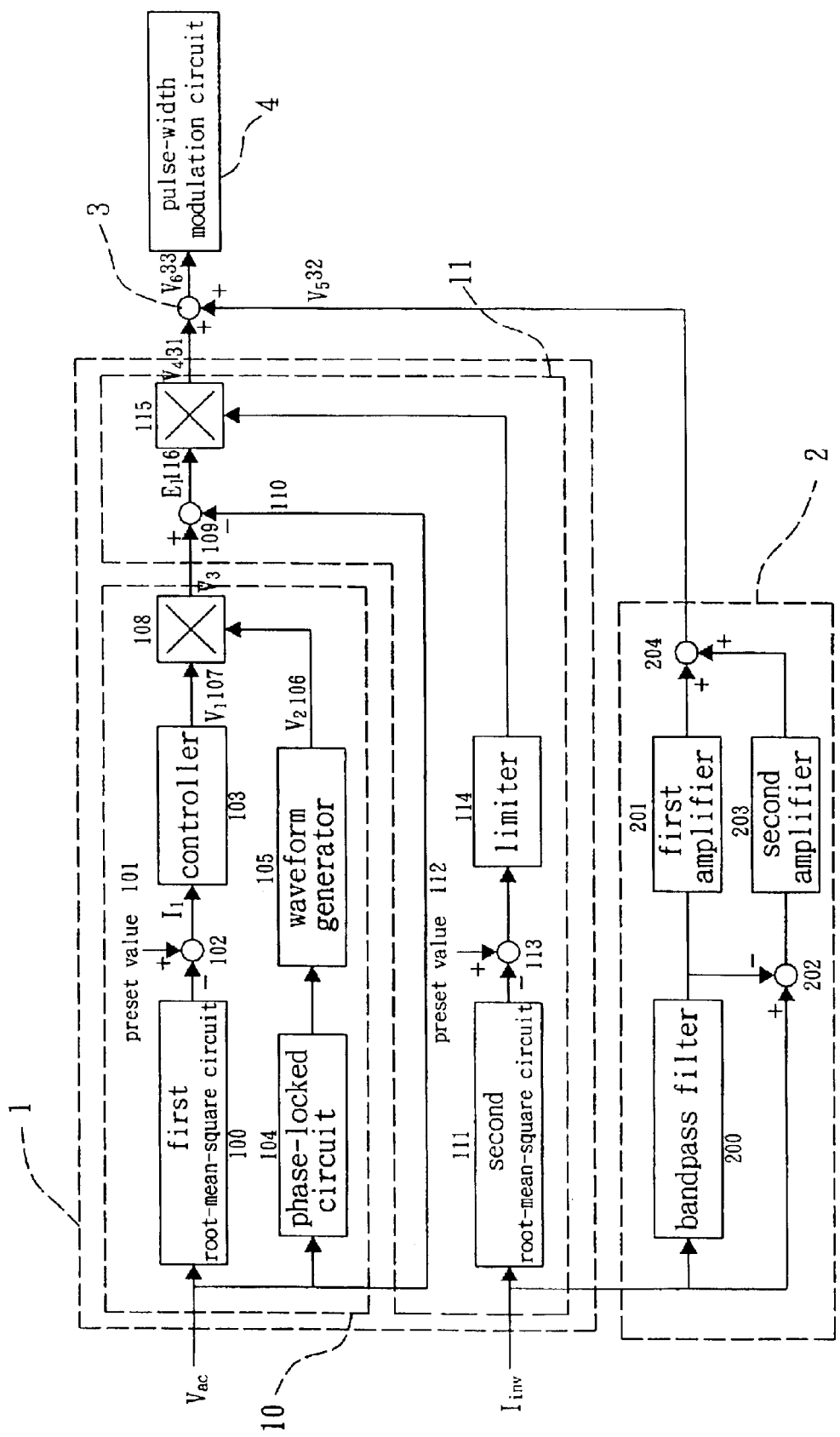
FIG. 3 is a control block diagram of parallel-connected power converters in accordance with the embodiment of the present invention.

FIG. 3 illustrates the control block diagram of parallel-connected power converters in accordance with the embodiment of the present invention. Referring again to FIG. 3, the control block of each parallel-connected power converter in accordance with the present invention includes two control circuits. One circuit is a voltage feedback circuit 1 and the other circuit is a current feed-forward circuit 2. In addition, the control method also includes an adder 3 and a pulse-width modulation circuit 4. The voltage feedback circuit 1 further includes a regulated control circuit 10 and a waveform control circuit 11.

Referring again to FIG. 3, the voltage regulated control circuit 10 is adapted to obtain the constant amplitude of power converter's output voltage for avoiding the variation of load. The voltage regulated control circuit 10 retrieves the power converter's output voltage $V_{ac}$, and then passes through the first root-mean-square circuit 100 to get a root-mean-square value. Subsequently, a subtractor 102 subtracts the root-mean-square value from a preset value 101. The preset value 101 is an expected root-mean-square value of the power converter's output voltage $V_{ac}$. The result of the subtractor 102 is sent to a controller 103 to generate the first control signal $V_1$ 107, and it is a DC signal. The power converter's output voltage $V_{ac}$ retrieved by the voltage regulated control circuit 10 is also sent to a phase-locked circuit 104 to lock phase. The output of the phase-locked circuit 104 is passed to a waveform generator 105 to generate the unity amplitude of a sinusoidal signal $V_2$ 106. The signals $V_1$ 107 and $V_2$ 106 are sent to a multiplier 108 to generate a reference signal $V_3$ 109, and then send to the waveform control circuit 11.

Referring again to FIG. 3, the waveform control circuit 11 is used to control the waveform of the power converter's output voltage, which can reduce the total harmonic distortion so as to supply a high quality AC power to loads. In addition, the gain of the waveform control circuit 11 is changed within a range and inversely proportional to the amplitude of power converter's output current, thereby regulating the amplitude of power converter's output current. The waveform control circuit 11 uses a subtractor 110 to substract the power converter's output voltage $V_{ac}$ from the reference signal $V_3$ 109 to generate an error signal $E_1$ 116. The waveform control circuit 11 uses a subtractor 113 to subtract the power converter's output current $I_{inv}$, which is passed to the second root-mean-square circuit 111, from a preset value 112. The maximum output current of power converter determines the preset value 112. The result of the subtractor 113 is sent to a limiter 114, and the output of the limiter 114 is the gain of the waveform control circuit 11. The limiter 114 is used to limit the output of the subtractor 113 in a predetermined range that determines a maximum and minimum gain. A multiplier 115 multiplies the output of the limiter 114 and the error signal $E_1$ 116, thereby obtaining an output signal $V_4$ 31 of the voltage feedback circuit 1. Thus, the gain of the waveform control circuit 11 can be adjusted to respond to the amplitude of power converter's output current.

Referring again to FIG. 3, the current feed-forward circuit 2 separates the power converter's output current into the fundamental component and the harmonic component, and then amplifies them by a different gain. Due to the variation of phase/amplitude of output voltage of each power converter's output voltage, it results in a significant fundamental circulating current among the parallel-connected power converters. The amplified fundamental component of feed-forward power converter's output current can be regarded as a fundamental resistor to be serially connected to the output terminal of the power converter, thereby suppressing the fundamental circulating current among the parallel-connected power converters. The suppression effect is proportional to the gain of the amplified fundamental component of feed-forward power converter's output current. The amplified harmonic component of feed-forward power converter's output current can be regarded as a harmonic resistor to be serially connected to the output L-C filter of the power converter and act as a damper, thereby preventing from high frequency oscillation generated by the L-C filter. In designing the waveform control circuit 11, it is simplified by adding the equivalent harmonic resistor and designing it at a higher gain, thereby attenuating the total harmonic distortion of power converter's output voltage under the nonlinear loads. The current feed-forward circuit 2 retrieves the power converter's output current $I_{inv}$, and then passes to a bandpass filter 200 to get the fundamental component. A subtractor 202 subtracts the fundamental component from the power converter's output current $I_{inv}$ to obtain a harmonic component. The fundamental component and the harmonic component are sent to the first amplifier 201 and the second amplifier 203 respectively, and then the amplified results are sent to an adder 204 to obtain an output signal $V_5$ 32 of the current feed-forward circuit 2. The current feed-forward circuit 2 acts as an equivalent fundamental resistor connected to an output terminal of the converter, thereby suppressing the circulating current among the parallel-connected power converters. The value of equivalent fundamental resistor is proportional to the gain of the first amplifier 201. Furthermore, the current feed-forward circuit 2 is operated as an equivalent harmonic resistor to act as a damper connected to the output terminal of the power converter, thereby preventing from a high-frequency oscillation generated by the L-C filter. The value of equivalent harmonic resistor is proportional to the gain of second amplifier 203.

Referring again to FIG. 3, the output signal $V_4$ 31 of the voltage feedback circuit 1 and the output signal $V_5$ 32 of the current feed-forward circuit 2 are added to form a modulation signal $V_6$ 33, which is sent to a pulse-width modulation circuit 4 to obtain the driver signals for the switching devices of power converter.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A control arrangement for parallel-connected power converters, each of said power converters comprising: a voltage feedback circuit adapted to retrieve a power converter's output voltage and output current and to control the power converter in a voltage control mode for supplying a high quality ac voltage, said parallel-connected power converters being commonly and directly connected with at least one load for supplying said controlled high quality ac voltage and a distribution current to the load; a current feed-forward circuit adapted to retrieve the output current of the power converter, said current feed-forward circuit being adapted to be operated as an equivalent impedance serially connected to the output of the power converter, said equivalent impedance thereby suppressing a circulating current oscillation, wherein a magnitude of power converter's output current is used to determine a gain of the voltage feedback circuit for balancing the distribution current among said parallel-connected power converters; and a modulation circuit adapted to add the outputs of the voltage feedback circuit and the current fee-forward circuit to generate a modulation signal, which is sent to a pulse-width modulator to generate driving signals for switching devices of the power converter.

2. The control arrangement for parallel-connected power converters as defined in claim 1, wherein no communication signals are used for current distribution among the power converters, and thus the reliability of the parallel-connected power converters is increased.

3. The control arrangement for parallel-connected power converters as defined in claim 1, wherein the voltage feedback circuit includes a voltage regulated control circuit and a waveform control circuit.

4. The control arrangement for parallel-connected power converters as defined in claim 3, wherein the voltage regulated control circuit is adapted to control the power converter's output voltage with constant amplitude no matter what the variation due to load.

5. The control arrangement for parallel-connected power converters as defined in claim 3, wherein the waveform control circuit is used to control the waveform of the power converter's output voltage, which can reduce the total harmonic distortion so as to supply a high quality AC power to loads, and wherein the gain of the waveform control circuit is changed with a range and inversely proportional to the amplitude of the power converter's output current, thereby regulating the output current of each power converter.

6. The control arrangement for parallel-connected power converters as defined in claim 1, wherein the current feed-forward circuit separates the power converter's output current into a fundamental component and a harmonic component, and amplifies them with different gains.

7. The control arrangement for parallel-connected power converters as defined in claim 6, wherein the amplified fundamental component acts as a fundamental resistor adapted to be serially connected to the output terminal of the power converter, thereby suppressing the fundamental circulating current among the power converters, and wherein the suppression effect is proportional to the amplification gain of the fundamental component of the power converter's output current.

8. The control arrangement for parallel-connected power converters as defined in claim 6, wherein the amplified harmonic component is regarded as a harmonic resistor adapted to be serially connected to an output L-C filter of the power converter and operated as a damper, thereby preventing high frequency oscillations from being generated by the L-C filter, and wherein the waveform control circuit is simplified by adding an equivalent harmonic resistor and designing the waveform control circuit at a higher gain, thereby attenuating a total harmonic distortion of the power converter's output voltage under nonlinear loads.

9. The control arrangement for parallel-connected power converters as defined in claim 3, wherein the voltage regulated control circuit includes a first mean-square-root circuit, a subtractor, a controller, a phase-locked circuit, a waveform generator and a multiplier.

10. The control arrangement for parallel-connected power converters as defined in claim 3, wherein the waveform control circuit includes a second mean-square-root circuit, a first subtractor, a limiter, a second subtractor, and a multiplier.

11. The control arrangement for parallel-connected power converters as defined in claim 1, wherein the current fee-forward circuit includes a bandpass filter, a subtractor, a first amplifier, a second amplifier and an adder.

12. The control arrangement for parallel-connected power converters as defined in claim 1, wherein the modulation circuit includes an adder, a pulse-width modulator and a drive circuit.

13. The control arrangement for parallel-connected power converters as defined in claim 1, wherein the voltage feedback circuit and the current fee-forward circuit are arranged in parallel to connect with the modulation circuit.

* * * * *